United States Patent Office 3,204,180
Patented Aug. 31, 1965

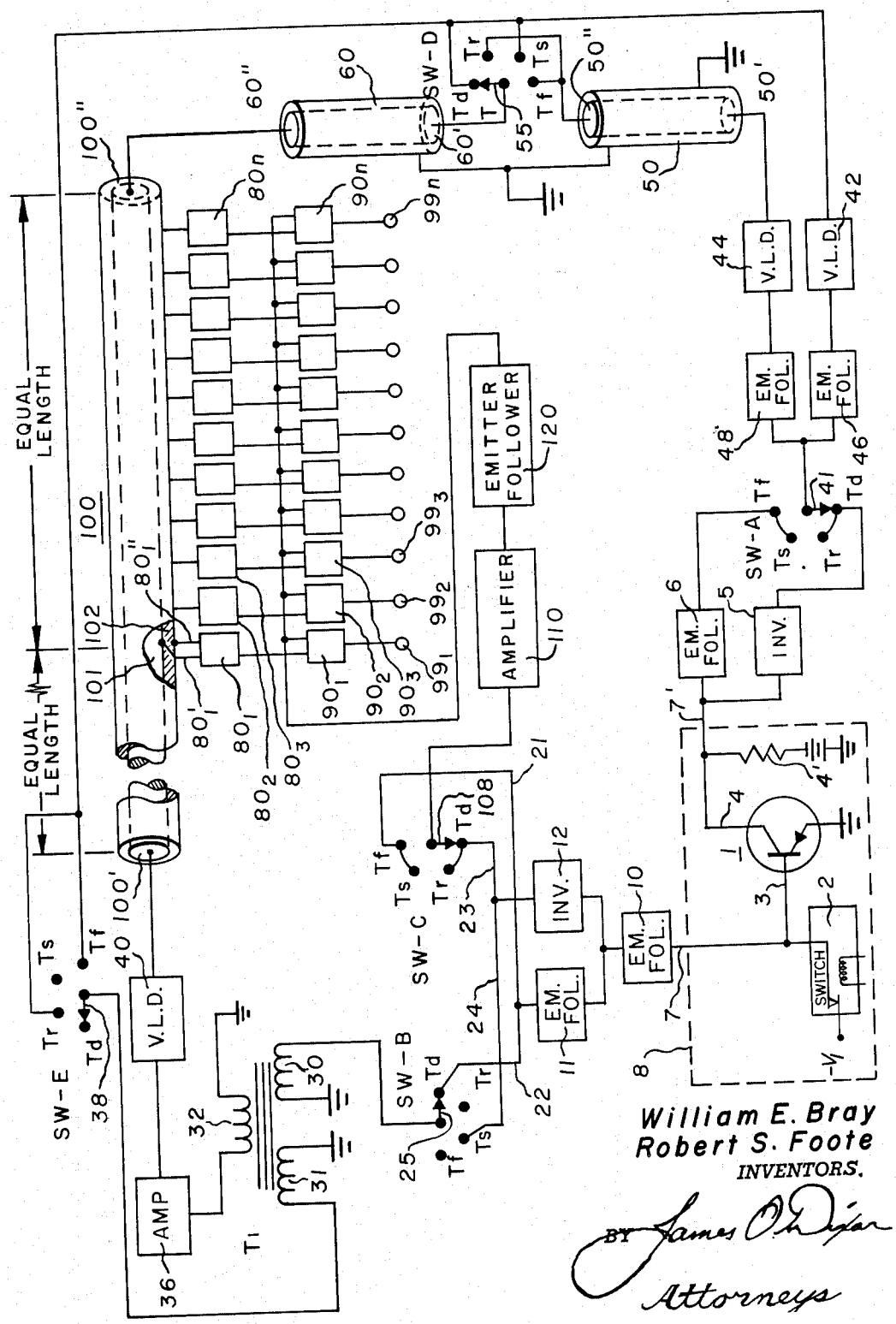

3,204,180
TIME MEASURING APPARATUS USING A TAPPED DELAY LINE
William E. Bray, Houston, and Robert S. Foote, Richardson, Tex., assignors to Texas Instruments Incorporated, Dallas, Tex., a corporation of Delaware
Filed Feb. 28, 1962, Ser. No. 176,392
26 Claims. (Cl. 324—68)

This invention relates to an apparatus for measuring the time between two events each of which is represented by an analog voltage. More specifically, the invention relates to an apparatus for measuring the rise and delay time of a pulse, the various switching time characteristics of a transistor and the like.

Because of the emphasis placed on extreme speed and accuracy of electronic circuitry, it is very often important to ascertain the exact time elapsing between the occurrence of two conditions in the operation of such circuitry. More specifically, it is often important to know the exact time that elapses between two events closely spaced together in time and each of which is represented by an analog voltage; an excellent example of two such events being the minimum and maximum voltages of the leading edge of a fast rising voltage pulse. By determining the time elapsing between these voltages, the rise time of the pulse is determined.

In utilizing a transistor in a specific circuit application, it is important to know the characteristics of the transistor, and especially the rise, fall, storage and delay times of its output in response to the origination or termination of a signal at its input. This invention provides, by way of an example of its utility, a means by which speed, accuracy and simplicity are achieved in the measurement of these properties.

It is therefore an object of this invention to provide an apparatus for measuring the time between two events each of which is represented by an analog voltage.

It is another object of this invention to provide an apparatus for measuring one or more of the switching characteristics of transistors.

It is a further object of the invention to provide an apparatus for measuring in sequence the different switching characteristics of a transistor.

It is a specific object of the invention to provide an apparatus for rapidly and sequentially measuring the rise, fall, delay and storage times of a transistor wherein a visual readout is employed to directly indicate the time of each.

Other objects, advantages and features of this invention will be better understood from the following description when taken in connection with the appended claims and the sole figure of the drawing, the figure being a block diagram of the apparatus of the invention.

The apparatus specifically described in connection with the figure of the drawing measures the switching speeds of a transistor by applying a signal pulse to the input of that transistor. The ten and ninety percent levels of the peak voltage of both the leading and trailing edges of the output pulse from the test transistor are detected and utilized in the following manner:

(1) The time interval between the instant of rise of a pulse applied to the transistor input and the 10 percent voltage level of the leading edge of the output pulse from the transistor is determined as a measure of the delay time;

(2) The interval between detections of the 10 and 90 percent voltage levels of the leading edge of the output is determined as a measure of the rise time;

(3) The interval between detections of the 90 and 10 percent levels of the trailing edge of the output provides an indication of the fall time; and (4) The interval between the instant of fall of a pulse applied to the input of the transistor and the 90 percent level of the trailing edge of the output pulse provides an indication of the storage time.

While the 10 and 90 percent levels of the peak voltage at the output of the transistor have been chosen as a matter of convenience in describing the invention, it should be understood that other percentage values of the peak voltage may be chosen to provide large enough differences to determine the rise and fall times of the output signal from the transistor being tested, and close enough to the zero and peak voltages of the output pulse to provide accurate measurement of the delay and storage time.

According to the invention, the delay time is measured by applying a signal to one end of a multiple-tapped delay line indicative of the instant at which a test signal pulse is applied to the input of the transistor being tested to initiate conduction thereof. At the instant when the output voltage of the transistor under test reaches a desired level, as for example 10 percent of its maximum value, a pulse is applied to the other end of the delay line. Voltage coincidence detectors at tapped points on the delay line are utilized to provide an exact time measurement of the delay. The other parameters are measured in a similar manner.

The circuit and apparatus for measuring the switching parameters of a transistor are shown in the block diagram of the sole figure of the drawing, and to facilitate the description of this apparatus, the invention will be described with reference to testing the parameters of a PNP transistor, although a reversal of appropriate polarities of the apparatus makes it equally applicable to the test of an NPN transistor.

A transistor 1 whose parameters are to be tested is connected via its base 3 to a switch 2, the switch being connected to a negative voltage $V_1$. The switch can be of the solenoid actuated type having mercury-wetted contacts to provide excellent conducting properties, the switch being able to provide a substantially square wave output pulse whose rise time is extremely short when the switch chops a steady D.C. voltage. Other square wave generators can also be used for the switch. In the apparatus as shown, the switch 2 provides a negative voltage pulse of extremely short rise time (five nano-seconds or less, for example) to the base 3 of the transistor 1 when the contacts of said switch are closed, and returns the voltage of the base 3 of the transistor from the negative voltage $V_1$ to ground potential in an extremely short time when the contacts of said switch are opened.

The application of a negative voltage to the base of the transistor causes a voltage rise at its collector 4 across the load 4′; and this positive going output signal at the collector is applied to an inverter 5 to produce a negative output signal. The output of the inverter 5 is connected to contacts $T_d$ and $T_r$ of switch SW–A. The inverter 5 comprises, for example, a transistor amplifier having a gain of unity, so that the output pulse therefrom is of the same amplitude and merely an inversion of the input pulse. The input circuitry of the inverter includes a properly poled diode so that the inverter is actuated only by a positive going pulse.

When the contacts of the switch 2 are opened, the base 3 of the transistor 1 is returned rapidly to ground potential, this being a positive going voltage. A corresponding voltage drop occurs at the collector 4 of the transistor, and the collector, being coupled to an emitter follower 6 having an amplification of unity, provides a negative going signal at the output thereof. The input circuitry of the emitter follower also includes a properly poled diode so that the emitter follower is actuated only by a negative going pulse. The output of the emitter follower 6 is connected to contacts $T_s$ and $T_f$ of switch SW-A.

Switch arm 41 of switch SW-A is connected to the inputs of emitter followers 46 and 48, the outputs thereof being connected to the inputs of voltage level discriminators 42 and 44, respectively. These voltage level discriminators each utilize a transistor biased to operate in its avalanche mode, and a description of the circuit and operation of such a discriminator is fully given in the copending application of William E. Bray and Dennis E. Tschudi, Serial No. 176,393, now abandoned, filed concurrently herewith. Discriminator 42 is so biased that it generates an output pulse of very short duration upon the application to its input of a voltage of magnitude equal to a predetermined percentage of the magnitude of the output pulse at the collector 4 of transistor 1. For the present discussion, this triggering voltage is assumed to be 10 percent of the output pulse of transistor 1, although this value can be altered as desired. The appropriate adjustments to the bias voltages of the discriminator 42 will be supplied in the following description. Discriminator 44 is similar to discriminator 42 but is so biased to generate a short duration output pulse when the input voltage is 90 percent of the magnitude of the output voltage of transistor 1.

The emitter followers 46 and 48, as hereinafter explained, prevent "ringing" or transient voltages from being impressed at the input of discriminator 44 during the time discriminator 42 generates an output pulse. In other words, these emitter followers are impedance means for isolating the input of one discriminator from the input of the other discriminator.

The output of discriminator 42 is connected to contacts $T_d$ and $T_s$ of switch SW-D and to contacts $T_r$ and $T_f$ of switch SW-E, the switch arm 38 of switch SW-E being connected to one primary 31 of transformer $T_1$. The output of discriminator 44 is connected to one end 50' of a delay line 50, the other end 50" of said delay line being connected to contacts $T_r$ and $T_f$ of switch SW-D. The contact arm 55 of switch SW-D is connected to one end 60' of a delay line 60, the other end 60" of said delay line being connected to the end 100' of delay line 100.

The output of the switch 2 is also connected to an emitter follower 10, whose output is connected to the input of another emitter follower 11 and the input of an inverter 12. The emitter follower 10 serves the purpose of an impedance matching device so that the test voltage pulses to the base 3 of transistor 1 are not distorted due to overloading the output of switch 2. The inverter 12 and emitter follower 11 are of the same design as inverter 5 and emitter follower 6, respectively, including properly poled input diodes.

The output of emitter follower 11 is connected to contact $T_d$ of switch SW-B and to contacts $T_s$ and $T_f$ of switch SW-C via connectors 22 and 21, respectively. The output of inverter 12 is connected to contact $T_s$ of switch SW-B and to contacts $T_d$ and $T_r$ of switch SW-C via connectors 24 and 23, respectively. Switch arm 25 of switch SW-B is connected to one primary 30 of transformer $T_1$, the secondary 32 thereof being connected to the input of an amplifier 36, and the output of amplifier 36 being connected to the input of a voltage level discriminator 40. The output of the voltage level discriminator 40 is connected to one end 100" of the coaxial delay line 100. The voltage level discriminator 40 utilizes a transistor biased to operate in its avalanche mode, and a description of the circuit and operation of such a discriminator is fully given in the aforesaid copending application of William E. Bray and Dennis E. Tschudi. Discriminator 40 is so biased that it generates an output pulse of very short duration upon the application to its input of a low voltage level, that is, when there is *any* increase in voltage at all at its input above (or below, according to appropriate polarity) the normal bias voltage.

Connected to spaced points along the delay line 100 between the exact center point and the end 100" thereof are coincidence detectors $80_1 \ldots 80_n$, the outputs of these detectors each being connected to respective registers $90_1 \ldots 90_n$. The total length of the delay line can be made any value whatever, although as one specific example, a length of 100 nano-seconds was used. Correspondingly, detectors $80_1 \ldots 80_n$ were connected to equally spaced points thereon at 5 nano-second intervals. Visual readout lamps $99_1 \ldots 99_n$ are provided to each of the outputs of the aforesaid registers. The coincidence detectors $80_1 \ldots 80_n$ comprise pulse height discriminators, and are identical in circuitry and operation to the voltage level discriminator which is fully shown in said copending application of William E. Bray and Dennis E. Tschudi.

From the following description of the operation of the circuitry shown in the drawings, it will be seen that one of the detectors $80_1 \ldots 80_n$ will produce an output pulse only in response to the coincidence of two pulses, traveling in opposite directions within said delay line 100, at the point on the delay line to which the one detector is electrically connected. Because of the high frequencies and extremely short times that are measured and registered by the circuit and apparatus, it is imperative that all ground connections from active elements be as short as possible. For example, a connection is made to the inner conductor 101 of delay line 100 and the outer conductor 102, the inner conductor 101 being connected to the input of the avalanche mode transistor of a detector via an impedance matching element and the outer conductor 102 being connected to the ground connection of said impedance matching element (not shown). The respective connections to the inner and outer conductors of the delay line 100 are preferably made at equal distances from the ends of the delay line. A portion of the delay line is shown in cut-away section to exemplify these connections to detector $80_1$, the inner connection being designated by numeral $80_1'$ and the outer connection being designated by numeral $80_1''$. The aforesaid impedance matching elements between the delay line and detectors preferably comprise simple transformers, since fast response times are required for the most effective operation. Other properly designed impedance devices may be used, however, such as, for example, an emitter follower. The registers $90_1 \ldots 90_n$ each comprise, for example, a conventional bistable flip-flop which is triggered by a pulse from the output of the detector to which it is coupled.

When pulse coincidence occurs at one of the detectors, the detector produces a pulse at its output which, in turn, triggers its respective register to give a visual readout. Once this has happened, it is necessary to reset the bistable flip-flop of the register, this being accomplished by applying to one of its inputs a high voltage at the appropriate time. As explained hereinafter, the switch contact 108 of switch SW-C is connected to the input of an amplifier 110, the output thereof being connected to each of the inputs to the registers via a step-down impedance matching element such as an emitter follower 120.

Before operating the transistor tester, the biases on the discriminators 42 and 44 are adjusted so that they generate an output pulse in response to their inputs of predetermined percentages of the maximum output voltage of transistor 1. This is accomplished, for example, by displaying the output voltage of transistor 1 on an oscilloscope and superimposing the output waveform from one of the discriminators on said output voltage. The bias of the discriminator is then adjusted until the discriminator triggers when the output voltage of transistor 1 attains a predetermined percentage of its maximum value. The bias on discriminator 40 is adjusted so that *any* output voltage causes it to conduct. The biases on the discriminators of the detectors $80_1 \ldots 80_n$ are similarly adjusted so that their conduction is incident to an input voltage of any predetermined value between the maximum voltage height of a pulse traveling in either direction in the delay line 100 and the maximum voltage height of the summation of a pair of coincident pulses traveling in opposite directions in the line.

*Measurement of delay time, $T_d$*

To measure the delay time $T_d$ of transistor 1, the movable switch arm of each of the switches SW–A, SW–B, SW–C, SW–D and SW–E is positioned on the contact designated $T_d$. Operation of the relay switch 2 is initiated by an alternating current source to provide negative pulses to the base 3 of transistor 1. The positive output pulses from the collector 4 of the transistor are applied to and actuate inverter 5, and the negative output pulses from the latter cause conduction of the emitter follower 46 so to initiate the operation of the voltage level discriminator 42. The discriminator 42 provides a short duration output pulse at the exact instant the voltage to its input reaches a level corresponding to 10 percent of the peak output voltage at the collector 4 of the transistor 1. As described in the above referenced copending application, the output signal of the discriminator has an extremely short duration, this duration being much smaller than the duration of the pulse at the output of the transistor 1. The short duration pulse from the discriminator 42 is applied to the end 60' of the delay line 60 through contact $T_d$ of switch SW–D, where it is subsequently applied to the end 100'' of delay line 100 from end 60'' of delay line 60.

The negative pulses from switch 2 are applied to the input of emitter follower 10 simultaneously with their application to the base 3 of transistor 1. Since only the delay time of the transistor is to be measured, only the negative going portion of the pulses from switch 2 are used to operate the circuit, as will become apparent from the following description. Negative pulses from the output of emitter follower 10 actuate emitter follower 11. (Since the diode at the input of inverter 12 is poled so that only positive going voltages will actuate it, the inverter 12 is not actuated on arrival at its output of the negative going portion of the voltage pulse.) The output from the emitter follower 11 is applied to primary winding 30 of transformer $T_1$ through switch SW–B. A negative pulse is then derived from the secondary 32 of transformer $T_1$ which is applied to the input of amplifier 36. The voltage level discriminator 40 is actuated upon the initial application to its input of the pulse applied thereto from the output of amplifier 36, the discriminator 40 applying a very short duration pulse to end 100' of delay line 100.

The principle of the invention is to send the short-duration pulse down the delay line from end 100' at the instant the pulse is applied to the base 3 of transistor 1 to start its conduction process. Subsequently a pulse is sent down the delay 100 in the opposite direction from end 100'' at the instant the output voltage at collector 4 of transistor 1 reaches 10 percent of its maximum value. As these pulses travel in opposite directions down the delay line 100, and since the pulse from end 100' is initiated before the pulse from end 100'', they will coincide somewhere in the delay line between the exact center and the end 100''. The pulses traveling from the opposite ends of the delay line are generally of approximately equal duration and of approximately equal height, the duration of each preferably being very short. When the two pulses coincide they are superimposed, and a summation of voltage results as a function of time. Assuming identical pulses of very short duration, there will be some point on the delay line 100 in which the voltage of the inner conductor at that point will be equal to exactly twice the magnitude of either of the pulses.

The detectors $80_1 \ldots 80_n$, each comprising a pulse height discriminator, detect the coincidence of the pulses traveling from opposite ends of the delay line 100 if care is taken to adjust the biasing of each of the pulse height discriminators in the detectors. For maximum accuracy of time measurement, the detectors will not be actuated unless a voltage is applied to their respective inputs of a value equal to twice the voltage height of either pulse. If this is the case, it is apparent that triggering of a detector would occur only upon the exact coincidence of the pulses traveling down the delay line. In practice, this is not easily obtained since there would have to be a vast number of detectors spaced very close together and distributed throughout half the length of the delay line. Moreover, since the pulses traveling from opposite ends of the delay line do have finite widths and are not exactly identical, it is hard to detect exactly what the summation will be upon coincidence thereof. Therefore, the bias on each of the detectors $80_1 \ldots 80_n$ is adjusted so that they are *actuated* upon the application to their input of a predetermined voltage between the maximum voltage of one of the pulses and the magnitude of the summation of the two pulses in coincidence. It is apparent that in order to increase the resolution of the system, the number of detectors spaced along the delay line should be increased, in addition to providing pulses at the ends 100' and 100'' of the delay line 100 of very narrow widths.

Since it is impossible to apply a voltage pulse at the end 100' of the delay line 100 at the exact instant the actuating pulse from switch 2 is applied to the base 3 of transistor 1 (this being due to the delay in the circuitry between the switch 2 and the end 100' of the delay line, the same reasoning applying to the pulse applied to the end 100'' of the delay line when the output voltage at the collector 4 of the transistor reaches 10 percent of its maximum value), a delay line 60 of predetermined length is inserted in the circuitry between the end 100'' and the discriminators 42 and 44. The delay line 60 is thus a correction factor interposed as a delay to the pulse arriving at the end 100'' of the delay line to offset the errors arising from the delay of the circuitry of the system. In practice, it is only necessary that the pulse applied to end 100' of the delay line precedes the pulse applied to the end 100'' of the delay line by an amount equal to the difference in time between the initial application of an initiating pulse to the base 3 of transistor 1 and the time at which the voltage at collector 4 reaches 10 percent of its maximum value. The delay line 50 serves the same purpose in conjunction with delay line 60 in the measurement of the rise and fall times of transistor 1.

As previously described, the coincidence of the pulses from the ends of the delay line 100 causes activation of a detector which, in turn, actuates one of the registers $90_1 \ldots 90_n$. If desired, visual readout lamps $99_1 \ldots 99_n$ can be connected to the outputs of the registers $99_1 \ldots 90_n$, these lamps being calibrated to indicate the magnitude of the time being measured.

Once the circuitry is actuated for the measurement of a time characteristic of the transistor 1, a short delay may be expected in order for the system to come to equilibrium, this being a result of transistor warm-up, random fluctuations of transient voltages throughout the systems, and the like. As a result, it is desirable to use an alternating current source for *actuating* switch 2. Thus, the particular time characteristic of the transistor is rapidly measured many times over a short period of time, the number of measurements made being equal to the frequency of the alternating current source that actuates switch 2. By using this alternating source and allowing the system to come to equilibrium, an accurate measurement of the time characteristic is made, whereas this accuracy would not be assured by relying on a single pulse being applied to the base 3 of the transistor by actuating the switch 2 with a D.C. voltage.

As noted before, each time one of the registers $90_1 \ldots 90_n$ is actuated by a pulse from its corresponding detector, the register must be reset so that it will be receptive to any subsequent pulse from its corresponding detector. The resetting is accomplished by applying a high voltage to its other input so as to trigger the bistable flip-flop therein back to its initial state. Since there is no assurance as to which register will need resetting, the high voltage is applied to all registers along the delay line to insure the resetting on all of them. The high voltage results from the application of pulses from the switch 2 via one of the outputs of the emitter follower 11 or inverter 12 to an amplifier 110 via switch SW–C, an emitter follower 120 being used as an impedance matching device to apply the high voltage to the registers from the output of the amplifier 110. The emitter follower 120 acts as a step-down impedance to prevent overloading any of the pulse circuits of the system. For example, during the measuring of the delay time $T_d$, only the negative-going portion of the pulse is actually utilized for creating and sending pulses down the delay line 100, although the positive-going portion of the pulse from the switch 2 actuates the inverter 12. The positive portion of the pulse initiates a pulse at the output of the inverter 12, and is coupled to the contacts $T_r$ and $T_d$ of switch SW–C. Thus the negative-going portion of the pulse actuates the system for the measurement of the delay time $T_d$, and the positive-going portion of the pulse immediately thereafter actuates the resetting of the registers $90_1 \ldots 90_n$. This sequence of actuation and resetting is utilized for the measurement of all of the time characteristics.

Measurement of rise time, $T_r$

To measure the rise time $T_r$ of the transistor 1, the movable switch arm of each of the switches is positioned on the contact designated $T_r$. Referring to contact $T_r$ of switch SW–B, it is noted that there is no connection thereto from the switch 2. The transistor 1 is actuated by the same process as described before, the discriminator 42 again being actuated when the voltage at the output of the transistor 1 reaches 10 percent of its amplitude, and the discriminator 44 being actuated when the voltage at the collector 4 reaches 90 percent of its amplitude. The output pulse from the discriminator 42 does not produce any pulse at the end 100″, as is noted from the configuration of switch SW–D, but is applied to the contact $T_r$ of switch SW–E. The switch arm 38 of switch SW–E is connected to the other primary 31 of the transformer $T_1$, thus producing a pulse at the end 100′ of the delay 100 in the same fashion as aforedescribed. The pulse at the end 100′ corresponds to the time when the voltage at the collector of the transistor 1 reaches its 10 percent value. Subsequently, the pulse derived from the output of the discriminator 44 is applied to one end 50′ of the delay line 50, the other end 50″ of the delay line being coupled to the end 60′ of delay 60 through switch SW–D. As a result, a pulse from discriminator 44 is applied to end 100″ of the delay line 100 corresponding in time to the 90 percent output voltage of transistor 1. In the measurement of the rise time $T_r$, it will be noted that another length of delay line 50 has been added to the circuit, so that the time difference between the pulses applied to ends 100′ and 100″ of the delay line 100 is exactly equal to the time required for the voltage at the collector 4 of transistor 1 to go from 10 percent of its maximum value to 90 percent of its maximum value. Again, the detectors and registers with corresponding read-out lamps are actuated to indicate the rise time of the transistor 1. Correspondingly, the registers are reset each time the measurement is made, in the same manner as for the measurement of the delay time.

Measurement of storage time, $T_s$

To measure the storage time, $T_s$, of the transistor 1, the movable switch arm of each of the switches is positioned on the contact $T_s$. In contrast with the measurement of the delay time $T_d$, the positive going portion of the pulse from switch 2 is used to initiate pulses at the ends 100′ and 100″ of the delay line 100, whereas the negative going portion of the pulse from switch 2 is used to generate, via amplifier 110, a high voltage for resetting registers $90_1 \ldots 90_n$. This becomes more apparent from noting the configurations of switches SW–A and SW–B, wherein the emitter follower 11 and inverter 5 are electrically disconnected from the circuitry between these switches and the ends 100′ and 100″ of the delay line 100. Other than these differences, the measurement of the storage time and the sequence of operation of the circuitry of the figure are the same as for the measurement of the delay time $T_d$.

Measurement of fall time, $T_f$

To measure the fall time, $T_f$, of the transistor, the movable switch arm of each of the switches is positioned on the contact $T_f$. In contrast to the measurement of the rise time $T_r$, the positive going portion of the pulse from switch 2 is used to create and initiate pulses at the ends 100′ and 100″ of the delay line 100, as is the case with the measurement of the delay time, $T_d$. The measurement is otherwise the same as that for the rise time, $T_r$.

Time between two events, in general

The apparatus shown can be slightly modified to extend its utility beyond the limits of measuring the time characteristics of a transistor by removing the portion of the apparatus enclosed within the dotted line represented by numeral 8. Electrically inserted in the place of the removed portion of the apparatus can be any apparatus exhibiting two events spaced apart in time, each of which is represented by a distinct analog voltage. Input 7 to emitter follower 10 and common input 7′ to emitter follower 6 and inverter 5 are electrically connected together, and the analog voltages representing the two events in time are applied to these common inputs. The biases of the discriminators 40, 42 and 44 can be adjusted to condition the discriminators for activation upon the application to their inputs of any desired analog voltage. In the same manner above described, the circuit and apparatus indicates via the detectors, registers and read-out lamps the time elapsing between the two events. As a ready example, the time characteristic of any pulse, regardless of its origination, can be measured in this manner.

It is to be understood that the above-described circuit arrangements are merely illustrative of the principles of the invention. Numerous other arrangements may be devised and various other circuit elements may be substituted for those shown without departing from the spirit and scope of the invention as defined by the appended claims.

What is claimed is:

1. Means for measuring the storage time of an electrical switching device following termination of a signal pulse to its input terminals comprising, means responsive to the change in voltage of the input signal as it decreases from its peak value to generate a first pulse as the input signal reaches a value slightly below the peak value, means responsive to the change in voltage of the output signal at the output terminals of the device for generating a second pulse as the signal at the output terminals decreases from its peak value to a value slightly below the peak value, a delay line, means for applying the first and second pulses to respective opposite ends of the delay line, and means coupled to the line at spaced points therealong for detecting pulse coincidence and providing an indication of the time interval between the applications of the first and second pulses to the line.

2. Means for measuring the storage time as defined by claim 1 in which the electrical switching device is a transistor and the input and output signals thereof are unidirectional pulses.

3. Means for measuring the storage time as defined by claim 1 in which the means responsive to the change in voltage of the output signal comprises means for deriving a signal therefrom having a rise time equal to the fall time of the output signal and generates the second output pulse in response to a voltage which is approximately one-tenth of the peak voltage of the derived signal and which corresponds to approximately nine-tenths of the peak voltage of the output signal.

4. Means for measuring the storage time as defined by claim 1 in which the means responsive to the output signal comprises a voltage level discriminating circuit including a transistor operating in the avalanche mode and biased to conduct at a voltage corresponding to value slightly below the peak value of the output signal.

5. Apparatus for measuring the time between two events each represented by an analog voltage, comprising a delay line, means including a first voltage level discriminator responsive to the analog voltage representing the first of said two events for generating and applying a pulse to one end of said delay line, means including a second voltage level discriminator responsive to the analog voltage representing the second of said two events for generating and applying a pulse to the other end of said delay line, and means connected to said delay line responsive to the coincidence of said pulses for indicating the time difference said two events.

6. The apparatus as defined by claim 5 wherein each of said voltage level discriminators includes a transistor that conducts in its avalanche mode in response to its respective analog voltage.

7. The apparatus as defined by claim 5 wherein the means connected to said delay line responsive to the coincidence of said pulse outputs for indicating the time difference between said two events includes a plurality of detectors connected to said delay line in calibrated spaced relation indicative of time units, including a plurality of signal devices respectively operatively associated with said detectors for indicating the time difference between said two events represented by the operated detectors.

8. The apparatus as defined by claim 7 wherein each of said voltage level discriminators includes a transistor that conducts in its avalanche mode in response to its respective analog voltage.

9. Means for measuring the rise time of a signal pulse comprising, means responsive to the leading edge of said signal pulse for generating a first pulse when the voltage of the leading edge of said signal pulse rises to approximately 10% of the peak voltage of said signal pulse, and for generating a second pulse when the voltage of the leading edge of said signal pulse has risen to approximately 90% of the peak voltage of said signal pulse, a delay line, means for applying said first and second pulses to opposite ends of the delay line, and means coupled to the line at spaced points therealong for detecting pulse coincidence to provide an indication of the time interval between the application of said first and second pulses to the line.

10. Means for measuring the rise time of a pulse as defined by claim 9, in which the means responsive to the leading edge of said signal pulse includes a pair of voltage level discriminating circuits respectively responsive to the 10 and 90 percent points of the peak voltage of the leading edge of said signal pulse, and means for simultaneously applying the leading edge of said signal pulse to the inputs of both discriminating circuits.

11. Means for measuring the rise time of a pulse as defined by claim 10 in which each of the voltage level discriminating circuits includes a transistor operating in the avalanche mode, one of the transistors being biased to conduct at the voltage which is approximately 10 percent of the peak voltage of said signal pulse and the other transistor being biased to conduct at the voltage which is approximately 90 percent of the peak voltage of said signal pulse.

12. Means of measuring the rise time of a signal pulse as defined by claim 9 including means for applying an energizing signal to the input of a transistor to be tested for rendering it conductive to generate at its output said signal pulse, whereby the rise time of the transistor is measured.

13. Means for measuring the fall time of a signal pulse comprising, means responsible to the trailing edge of said signal pulse for generating a first pulse when the voltage of the trailing edge of said signal pulse decreases to approximately 90 percent of the peak voltage of said signal pulse, and for generating a second pulse when the voltage of the trailing edge of said signal pulse has decreased to approximately 10 percent of the peak voltage of said signal pulse, a delay line, means for applying said first and said second pulses to opposite ends of the delay line, and means coupled to the line at spaced points therealong for detecting pulse coincidence to provide an indication of the time interval between the applications of the first and second pulses to the line.

14. Means for measuring the fall time of a signal pulse as defined by claim 13, in which the means responsive to the trailing edge of said signal pulse includes a pair of voltage level discriminating circuits respectively responsive to the 90 and 10 percent points of the peak voltage of the trailing edge of said signal pulse, and means for simultaneously applying the trailing edge of said signal pulse to the inputs of both discriminating circuits.

15. Means for measuring the fall time of a signal pulse as defined by claim 14, in which each of the voltage level discriminating circuits includes a transistor operating in the avalanche mode, one of the transistors being biased to conduct at the voltage which is approximately 10% of the peak voltage of said signal pulse and the other transistor being biased to conduct at the voltage which is approximately 90% of the peak voltage of said signal pulse.

16. Means for measuring the fall time of a signal pulse as defined by claim 13, including means for applying an energizing signal to the input of a transistor to be tested for rendering it conductive to generate at its output said signal pulse whereby the fall time of the transistor is measured.

17. Means for measuring the fall time of a signal pulse as denfied by claim 13, in which the means responsive to the trailing edge of the signal pulse includes means for deriving a signal therefrom having a rise time equal to the fall time of the trailing edge of said signal pulse.

18. Means for measuring the fall time of a signal pulse as defined by claim 13, in which the means responsive to the trailing edge of the signal pulse includes means for deriving a signal having a rise time equal to the fall time of the trailing edge of said signal pulse, a pair of voltage level discriminating circuits respectively responsive to said 90 and 10 points of the peak voltage of said signal pulse, and means for simultaneously applying the leading edge of the derived signal to both voltage level discriminating circuits, the first generated pulse corresponding to the 90 percent point of the peak voltage of said signal pulse and the second pulse corresponding to the 10 percent point of the trailing edge of the signal pulse.

19. Means for measuring the delay time of an electrical switching device in providing an output signal in response to a signal applied to its input, comprising means responsive to the leading edge of said input signal at approximately 10 percent of the peak voltage thereof for generating a first pulse, means response to the leading edge of said output signal at approximately 10 percent of the peak voltage thereof for generating a second pulse, a delay line, means for applying the first and second pulses to opposite ends of the delay line, and means coupled to the line at spaced points therealong for detecting pulse coincidence and providing an indication of the time interval between the applications of said first and second pulses to the line.

20. Means for measuring the delay time as defined by claim 19, in which the electrical switching device is a transistor.

21. Means for measuring the delay time as defined by claim 19, in which the means responsive to the leading edges of the input and output signals comprise voltage level discriminating circuits.

22. Means for measuring the delay time as defined by claim 21, in which the voltage level discriminating circuits each includes a transistor operating in the avalanche mode, the transistor of the discriminating circuit responsive to the leading edge of said input signal being biased to generate the first pulse at a voltage approximately 10 percent of the peak voltage thereof and the transistor of the discriminating circuit responsive to the leading edge of said output signal being biased to generate the second pulse at approximately 10 percent of the peak voltage of said output signal.

23. Means for selectively measuring the rise and fall time of a transistor comprising, means for applying a signal pulse to the input terminals of a transistor for producing an output pulse, a first and second voltage level discriminating circuits respectively responsive to approximately 10 percent of the peak voltage of said output pulse and approximately 90 percent of the peak voltage of said output pulse to respectively generate first and second pulses, means responsive to the trailing edge of said output pulse for deriving a signal having a rise time equal to the fall time of said output pulse, a delay line, means for coupling the outputs of the discriminating circuits to opposite ends of the delay line, means for selectively applying the leading edge of said output pulse to both inputs of the discriminating circuits simultaneously for determining the rise time, said derived signal being applied to both inputs of the discriminating circuits simultaneously for determining the fall time, and means coupled to the delay line at spaced points therealong for detecting pulse coincidence to provide an indication of the time interval between the generation of the first and second pulses.

24. Means for selectively measuring the rise and fall time as defined by claim 23, in which the voltage discriminating circuits each includes a transistor operating in the avalanche mode, one of said transistors being biased to conduct at a voltage level corresponding to approximately 10 percent of the peak voltage of said output pulse and the other transistor being biased to conduct at a voltage level corresponding to approximately 90 percent of said peak voltage.

25. Means for selectively measuring the rise and fall time as defined by claim 23, in which the detecting and indicating means each comprises a voltage summation device, a switching circuit rendered operative upon pulse coincidence, and a lamp energized by said switching device to provide a visual indication of the time interval.

26. Means for selectively measuring the rise and fall time as defined by claim 25 in which the switching circuit comprises a bi-stable multivibrator, and means operated by the trailing edge of the signal pulse for presetting all of said multivibrators.

References Cited by the Examiner

UNITED STATES PATENTS

| | | | |
|---|---|---|---|
| 2,623,106 | 12/52 | Fassberg | 324—68 |
| 2,739,865 | 3/56 | Willey. | |
| 3,007,113 | 10/61 | Krienberg | 324—68 |
| 3,041,537 | 6/62 | Cagle et al. | 324—68 |
| 3,068,405 | 12/62 | Glazer et al. | 324—68 |
| 3,074,017 | 1/63 | Sunstein et al. | 324—158 |
| 3,080,522 | 3/63 | Embree et al. | 324—68 |

OTHER REFERENCES

"A Production Method for Measurement of Rise, Fall and Storage Time" (D. G. Paterson), Application Notes, Motorola Semiconductor Products, Incorporated, dated September 1960.

WALTER L. CARLSON, *Primary Examiner.*

FREDERICK M. STRADER, *Examiner.*